US006341180B1

(12) United States Patent
Pettersson et al.

(10) Patent No.: US 6,341,180 B1
(45) Date of Patent: Jan. 22, 2002

(54) IMAGE CONTENT AUTOFOCUS FOR MICROSCOPY USING A NOISE-INSENSITIVE FOCUS FILTER (75) Inventors: Magnus Pettersson, Västerås; Anders Rosenqvist, Lund, both of (SE)

(73) Assignee: Cellavision AB, Lund (SE)

( * ) Notice: Subject to any disclaimer, the term of this patent is extended or adjusted under 35 U.S.C. 154(b) by 0 days.

(21) Appl. No.: 09/212,720

(22) Filed: Dec. 16, 1998

Related U.S. Application Data (60) Provisional application No. 60/071,176, filed on Dec. 18, 1997.

(51) Int. Cl.[7] .................................................. G06K 9/40
(52) U.S. Cl. ........................................ 382/255; 382/263
(58) Field of Search .......................... 382/255, 260–269; 348/345–349, 353, 354, 355

(56) References Cited

U.S. PATENT DOCUMENTS

| 5,231,443 A |   | 7/1993  | Subbarao ............... 354/400 |
| 5,404,013 A | * | 4/1995  | Tajima ................... 350/332 |
| 5,760,387 A | * | 6/1998  | Ortyn et al. ............. 250/201.3 |
| 5,790,710 A |   | 8/1998  | Price et al. .............. 382/255 |
| 5,875,258 A | * | 2/1999  | Ortyn et al. ............. 382/133 |
| 5,995,143 A | * | 11/1999 | Price et al. .............. 348/345 |

FOREIGN PATENT DOCUMENTS

| EP | 0408224 A2 | 1/1991 |
| WO | WO9601438 | 1/1996 |
| WO | WO9612981 | 5/1996 |

OTHER PUBLICATIONS

Abstract of PCT Publication No. WO98 35256, Aug 13, 1998.
Ian T. Young, *Quantitative Microscopy*, http://www.ph.tn-.tudelft.nl/, Delft, pp. 1–15.
Lindgren and Rootzén, *Stationära Stokastika Processer*, (*Stationary Stochastic Processes*), KF–Sigma, Lund, pp. 183–186, 1992.
D. Vollath, Automatic focusing By Correlative Methods, Journal Of Microscopy, vol. 147, pp. 279–288, Sep. 1987.
Ahmed Erteza, *Depth Of Convergence Of A Sharpness Index Autofocus System*, Applied Optics, vol. 16, No. 8., pp. 2273–2278, Aug. 1977.
Applied Optics, vol. 16, No. 8., pp. 2273–2278, Aug. 1977.

* cited by examiner

*Primary Examiner*—Thomas D. Lee
*Assistant Examiner*—Stephen Brinich
(74) *Attorney, Agent, or Firm*—Cooper & Dunham LLP (57) ABSTRACT An autofocusing system in which optimal or nearly optimal linear filters are selected for filtering an image signal so that the components of the image signal which contain image content, and thus, focus information are amplified while the components of the image signal which contain noise are damped. One set of nearly optimal linear filters are modified second order difference filters in which the number of internal zeros are modified to tune the filter to the particular equipment.

15 Claims, 6 Drawing Sheets

FIG.6A
FIG.6B
FIG.6C

IMAGE CONTENT AUTOFOCUS FOR MICROSCOPY USING A NOISE-INSENSITIVE FOCUS FILTER

This application claims the benefit of U.S. Provisional Application No. 60/071,176 filed Dec. 18, 1997. The Provisional Application is incorporated by reference.

FIELD OF THE INVENTION

The present invention relates to systems (procedures and/or devices) for autofocusing according to the content of an image and, more particularly, to an autofocusing system for microscopes and similar instruments which is insensitive to noise.

BACKGROUND OF THE INVENTION

Microscopes and other optical instruments need to focus on an object of interest. Preferably, only one focusing step is performed for each object and, once focused, the object will remain in focus. Ideally, for an instrument which scans an object, the object remains in focus while scanning is performed. However, the object analyzed by optical instruments is typically not flat. In addition, not all objects of interest are situated at the same depth with respect to the objective lens. Accordingly, some refocusing is required for such scanning instruments.

With scanning instruments, once a crude focus position has been found, and if the scanning of the object is done in small steps, fine focus adjustments can be sufficient to keep the object in focus so long as the adjustments are performed after each step (movement). For a microscope's objective lens with a numerical aperture of 1.3, a fine focusing adjustment with an accuracy of about ±0.1 micrometers can be required after each step. The procedures used for crude and fine focusing can be the same, although the range of the search and the search step length are usually different. However, if the fine focusing procedure is computationally too intense, another, less intense, more approximate, procedure may be used for crude focusing.

A typical autofocusing procedure system primarily: (1) estimates what the focus (distance and/or angle of the objective lens relative to the object) should be; and (2) mechanically adjusts the distance and/or angle by the focusing mechanism using a predetermined search strategy which is implemented using a controller. Some autofocusing systems use image content information to estimate the focus. Such systems are often called 'passive autofocusing systems'. In such an image content autofocusing system, the image detected by the microscope is provided to a subsystem which estimates the focus.

One benefit of image content autofocusing systems is that the calculations can be performed in software, that is, extra hardware is not needed, thereby reducing the cost of the system. Also, with an image content autofocusing system, any discrepancy (drift) between the estimated focus calculated by the focusing subsystem and the ability of the focusing mechanism to implement the estimated focus is detectable and can be eliminated. Typical applications for image content autofocusing systems include inspecting chips in the semiconductor industry and all kinds of medical microscopy. In addition, if an image content autofocusing system does not need to have highly repeatable focusing mechanics, the focusing mechanism cost can be considerably reduced.

The performance of an image content autofocusing system is primarily limited by the desired search speed for the instrument and the noise-sensitivity of the focus estimation procedure. The search speed depends, among other parameters, on: (1) the rate at which images of the object are acquired (video frame rate); (2) the speed at which the focusing mechanism can respond (mechanical time constants); (3) the search range, once focused; (4) the search step length; (5) the amount of time required for image processing; and (6) the computing power available. In addition, interference from noise must be taken into account by the focus estimation procedure or the optimal focus can not be achieved. In other words, if the focus estimation subsystem is noise-sensitive, the focus estimate will not correspond to the optimal (maximum) desired focus position.

Two typical image content autofocusing procedures which are noise-sensitive maximize the statistical variance of the content of the raw image or the statistical variance of a high-pass filtered version of the image content. Despite the noise-sensitivity, these statistical variances can be used for finding a crude focus position.

To correct for the noise-sensitivity, some conventional procedures measure the statistical variance at multiple foci in the search range, and then using curve-fitting techniques better estimate the optimal (maximum) focus for the objective lens. See, for example, U.S. Pat. No. 5,790,710.

However, such post-processing (a posteriori) curve-fitting techniques have several drawbacks: (1) the mechanical step lengths of the focusing mechanism must be precise for the curve-fitting technique to be accurate; (2) the optimal focus is not known until after all the images used by the procedure have been taken; and (3) the optimal focus may be near the edge of the curve, which can adversely affect the curve-fitting.

Correcting for these drawbacks is usually costly in terms of time or expense because, for example: (1) a more expensive focusing mechanism must be used for precise positioning; (2) more storage may be required to store all the images until the image corresponding to the optimal focus can be determined; and (3) the entire procedure may have to performed again, starting at a different focus estimate, to ensure that the optimal focus is not near the edge of the curve. Although one solution to having more storage takes advantage of a precise positioning focusing mechanism required for other purposes, going back to grab an image at the optimal focus after the post-processing can have problems caused by hysteresis in the control of the focusing mechanism and can take longer to locate the optimal focus.

SUMMARY OF THE INVENTION

This invention provides solutions to the problems encountered with conventional autofocusing systems by employing a noise-insensitive filter which operates on image signal data from "grabbed" images of the already existing microscope camera.

One goal of the invention is to provide an autofocusing system which uses a low-cost focusing mechanism by having a filter calculator employ a filter capable of achieving the optimal focus using the content of the image (focus function) without the need for any curve-fitting technique to maximize the measured amount of focus (focus metric) from an energy calculator.

Another goal of the invention is to minimize the amount of time required to obtain a sharp focus.

One object of the invention is to provide a device for determining a focus between an image sensor and an object having: (1) an image sensor for receiving an image of the object and for generating an image signal from the image, the image signal having an image component and a noise component; (2) a filter calculator for receiving the image signal and for generating a filtered image signal such that the noise component of the image signal has been reduced, the noise component being reduced by increasing the energy contributions of parts of the image signal which contribute a relatively larger proportion to the image component than the noise component and by decreasing the energy contributions of other parts of the image signal which contribute a relatively larger portion to the noise component than to the image component; (3) an energy calculator for receiving the filtered image signal and determining an energy level of the filtered image signal; (4) a controller for receiving the energy level and for generating a position control signal in accordance with the energy level; and (5) a positioning mechanism for receiving the control signal and performing a focus adjustment based on the control signal. This filter calculator can also have a linear convoluter; and a filter selected from the group consisting of: a Wiener filter, a modified second order difference filter, and a bandpass filter. The filter can be a one-dimensional array. Also, the filter calculator can be limited to only operate on: (1) the image signal in accordance with a single direction in the image; and/or (2) portions of the image signal corresponding to selected sections of the image.

In addition, the device can include a filter generator for determining the filter characteristics. The filter generator can have: (1) a frequency spectrum generator for receiving image signals and for generating image frequency signals; and (2) a filter optimizer for selecting those characteristics which maximize the signal-to-noise ratio of at least a portion of the image signal. The filter generator can also be a modified second order difference filter generator for selecting the modified second order difference filter from a group of modified second order difference filters which yields the maximum ratio of peak energy level to peak energy width for a plurality of images. Furthermore, the modified second order difference filter can be a first negative value, one or more first zero values, a positive value, one or more second zero values and a second negative value. Also, the number of first and second zero values can be limited to 15.

Another object of the invention is to provide a method for determining a focus between an image sensor and an object having the steps of: (1) generating an image signal from an image of the object, the image signal having an image component and a noise component; (2) filtering the image signal to generate a filtered image signal such that the noise component of the image signal has been reduced by increasing the energy contributions from parts of the image signal which contribute a relatively larger proportion to the image component than the noise component and by decreasing the energy contributions from other parts of the image signal which contribute a relatively larger portion to the noise component than to the image component; (3)generating an energy level from the filtered image signal; (4) generating a position control signal from the energy level; and (5) changing the focus according to the position control signal. Further, selected parts of the image signal where the energy contribution is increased, can be the lower frequencies. The method can also include the steps of convolving a filter with the image signal, the filter selected from the group consisting of: a Wiener filter, a modified second order difference filter, and a bandpass filter. In addition, the method can include the steps of: (1) generating a filter from frequency spectra of one or more image signals; and (2) optimizing the filter by selecting those characteristics which maximize the signal-to-noise ratio of at least a portion of the image signals. Also, the method can include the step of generating a modified second order difference filter by selecting the modified second order difference filter from a group of modified second order difference filters which yields the maximum ratio of peak energy level to peak energy width for a plurality of image signals. In addition, the filtering step can include the steps of: operating on the image signal only in accordance with a single direction in the image; and/or operating only on selected sections of the image signal. Further, the method can include the step of generating a modified second order difference filter by selecting the number of zeros to place between each endpoint and the center of the modified second order difference filter.

These objects and other objects, advantages, and features of the invention will become apparent to those skilled in the art upon consideration of the following description of the invention.

DETAILED DESCRIPTION OF THE INVENTION

Figure 1:
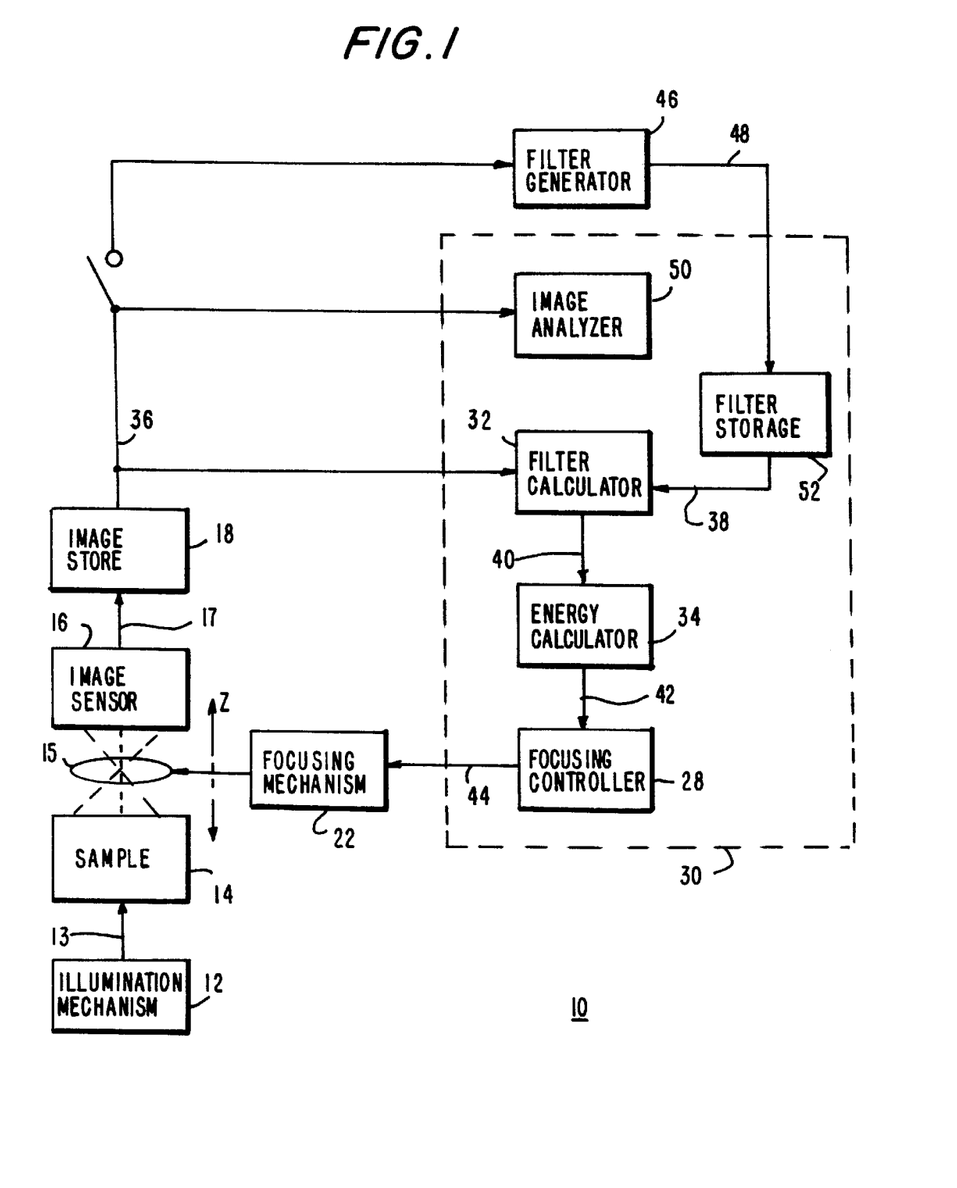
FIG. 1 is a block diagram illustrating one embodiment of the invention in which an image content autofocusing system is related to the instrument parts used for performing various aspects of the invention.

FIG. 1 illustrates an image content autofocusing system 10 according to the invention. The autofocusing system 10 has an illumination mechanism 12 which provides light 13 to the sample (objects) 14 to be observed. The illumination mechanism 12 can be a light source, a mirror reflecting light from another light source, or other illumination mechanisms known in the art. The light 13 from the illumination mechanism 12 illuminates the sample 14 causing an image of the sample 14 to form on an image sensor 16 after passing through an objective lens or lens system 15. The image sensor 16 captures the image 17. The image sensor 16 can be part of an optical instrument such as a microscope, X-ray device, camera, or any other suitable image capture device.

Usually, the image 17 is a digital representation of a captured analog image. Optionally, the image 17 can be stored in a storage device 18, however, some image sensors provide such storage. The focusing mechanism 22 which can include a motor, mechanically moves the objective lens or equivalent 15 closer to, or away from the sample 14. A focusing controller 28, which can be implemented as software for a microprocessor 30, controls the operation of the focusing mechanism 22 in accordance with one embodiment of the invention.

FIG. 1 also shows the autofocusing subsystem of this invention. The autofocusing subsystem has two primary components: filter calculator 32 and energy calculator 34.

Either or both of the filter calculator 32 and energy calculator 34 can be implemented in separate hardware, or preferably, in software on the same, or a different, microprocessor 30 which controls the focusing mechanism 22.

The focusing controller 28 according to one embodiment of the invention responds to changes in the focus as determined from the image content component of the image signal 36, but at the same time is not sensitive to the noise component of the image signal. In microscopy, particles on objective lens 15 surfaces, dark current noise in the image sensor and noise in the amplifier and/or the analog-to-digital converter contribute to the noise component.

In operation of one embodiment of the invention, the filter calculator 32 receives the image signal 36 from the image 17 captured by the image sensor 16.

Figure 2:
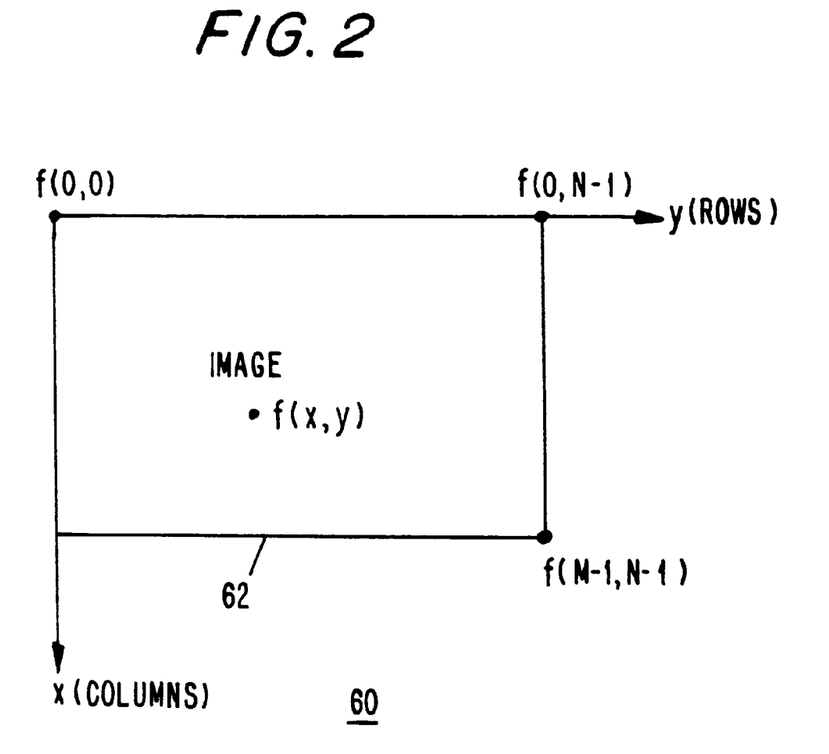
FIG. 2 is a diagram indicating the coordinate representation assigned to an image according to one embodiment of the invention.

FIG. 2 shows a coordinate system 60 applied to the image 62 according to one embodiment of the invention. Alternatively, other coordinate systems can be applied to the image 62 within the scope of this invention.

The filter calculator 32 operates row-wise on the image 62 by multiplying and summing (linearly convolving) each element of the image signal 36 with a selected linear filter 38, g(y). According to this invention, the filter 38 should be selected to enhance the image content components and de-emphasize noise components as discerned from images taken at different foci. The two equations below mathematically describe how the filter calculator 32 applies the filter 38 to the image signal 36. The image signal 36 can be represented mathematically as a function, f(x,y,z). The filter calculator 32 generates a filtered image signal 40 which can also be mathematically represented as a function, h(x,y,z). Equation 1 illustrates the operation of the filter calculator 32 in the spatial domain, and Equation 2 illustrates the operation of the filter calculator 32 in the frequency domain.

$$h(x, y, z) = f(x, y, z) * g(y) = \sum_{i} f(x, y-i, z) \cdot g(i) \qquad \text{Equation 1}$$

$$H(x,v,z) = F(x,v,z) \cdot G(v) \qquad \text{Equation 2}$$

Note that the filter 38 is only dependent upon the y-direction of the coordinate system 60. Accordingly, the Fourier transform of the raw image, F(x,v,z), is only performed in the y-direction. The resulting Fourier transform is then still a function of the spatial parameters x and z. Also, because of the length of the filter 38, the edges of the image 17 in the y-direction will not be included in the filtered signal 40. However, because the edges of the image usually contain only background (non-object) information, this truncation does not adversely affect the operation of this autofocusing system.

The energy calculator 34 of the microprocessor 30 calculates he energy level 42, P(z), of the filtered image signal 40, and is mathematically described below in Equation 3.

$$P(z) = \sum_{x} \sum_{y} (h(x, y, z))^2 \qquad \text{Equation 3}$$

The primary task of the filter 38 is to maximize the signal-to-noise ratio, 'SNR', of the image signal 36, that is, to maximize the ratio of signal (image content information) energy with respect to the noise energy.

The focusing controller 28 receives the energy level 42 and generates a control signal 44 for causing the focusing mechanism 22 to move the objective lens 15 in the z-direction toward, if not to, the optimal focus. The focusing controller 28 employs a search strategy for determining the optimal focus which corresponds to the focus yielding the highest energy level 42.

In one embodiment, the search strategy is a linear search. The linear search positions the objective lens 15 at a z-position which is known to be above the optimal focus (for example, for one microscope, the initial crude focus position is approximately 2 millimeters above the sample 14). The autofocusing system then grabs an image at that position and moves the objective lens toward the sample 14 in the z-direction in steps. At each step, an image 17 of the sample 14 is grabbed, the image signal 36 is generated and filtered, and the energy in the filtered image signal is calculated. When the energy decreases instead of increasing at a step, the maximum energy has been passed. Accordingly, the last image signal 36 is selected as the optimal focus (sharpest focus). The last image signal 36 is then selected for image analysis 50. If two image sensors are available, each image sensor can sense the same image at a different focus displaced from each other in the z-direction. By relating the energy level from each of these foci, the optimal focus can be more quickly determined. Other search strategies can be used with this invention including a binary search or a sequential search with later curve-fitting to identify the maximum. However, the binary search can suffer from hysteresis in the up/down movement required of the focusing mechanism 22 and the sequential search requires more storage, and post-processing.

Selection of a filter 38 is performed for this invention by filter generator 46. Filter generator 46 outputs a filter 48 into filter storage 52 which provides the filter 38 used by the filter calculator 32. If enough processing power is available, the filter generator 46 can generate filters as the autofocusing system operates based on the image signals 36. However, in one embodiment of the invention, once filters are selected for frequency adjustments (fine and coarse adjustments) for particular equipment, the filters do not need to be modified. Thus, one embodiment of the invention provides filters which are sufficiently robust so as not to require modification after the autofocusing system is manufactured.

To select a filter, the filter generator 46 should optimally account for all the sources of the image signal's 36 image content component and noise component. As is known in the art, the image content component and the noise component of the image signal 36 of an image content autofocusing system arise from the following:

(A) the frequency spectrum of the object at the illuminated wavelengths;

(B) the optics at the illuminated wavelengths (which can be represented mathematically as an optical transfer function);

(C) the magnification and the pixel size;

(D) additional filtering in the system (for example, damping in cables or electronics between when the image is grabbed and when the image arrives at the filter calculator; and (E) the noise spectrum (noise from the lenses, image sensor, cables and other hardware).

A, B, C and D affect the spectrum of the image content component which is the desired signal, while C, D and E affect the spectrum of the noise component. Although motion during exposure can result in a blur which also affects the frequency spectra of the image signal, this effect can be compensated for by the image sensor characteristics. Filter 38 should adapt to A through E. Further, when A through E change, filter 38 should be adjusted to remain optimal.

Another consideration for the filter concerns C, that is, the magnification and pixel size of the image sensor 16. If the output from the optical system is not sampled densely enough by a digital image sensor, aliasing occurs. In order to avoid such aliasing, half of the sampling frequency, the Nyquist frequency, has to be higher than the highest occurring spatial frequency in the output of the optical system.

Thus, the image signal 36 includes both focus information from the image content component which depends on the distance in the z-direction of the sample 14 from the objective lens 15, and noise information which is not dependent on the distance of the sample from the objective lens. Thus, the image signal 36 ($f_0$) depends on "z", whereas the noise (n) varies each time an image 17 is taken (grabbed). In Equations 4 and 5, the variation of the noise from image to image is represented by the variable "$\omega$" to indicate that the noise component is not solely dependent on the z position.

$$f(x,y,z) = f_0(x,y,z) + n(x,y,\omega) \quad \text{Equation 4}$$

$$F(x,v,z) = F_0(x,v,z) + N(x,v,\omega) \quad \text{Equation 5}$$

Figure 3:
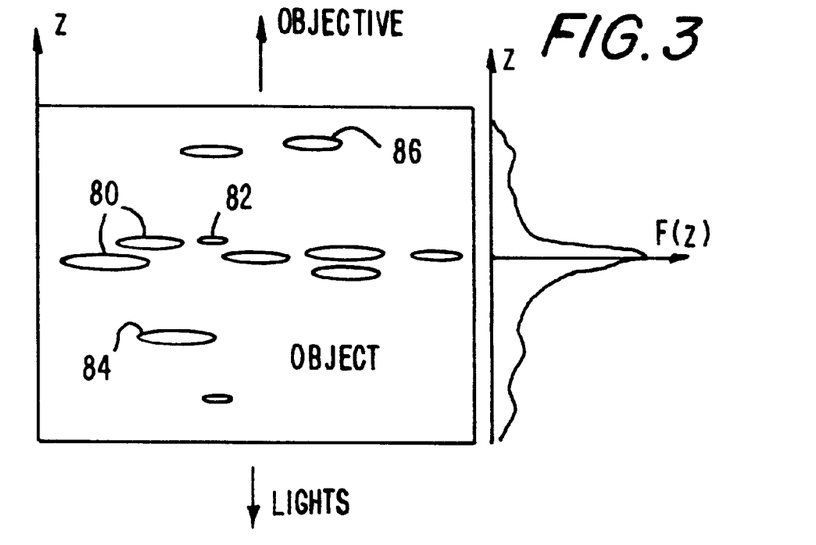
FIG. 3 is a diagram illustrating the sensitivity of an autofocusing system to different focus planes according to one embodiment of the invention; to the left a sample with blood cells at different distances from an objective lens (depths) is shown; to the right an approximate energy response curve (autofocus function) shows how the different planes affect the shape of the curve.

FIG. 3 illustrates both the desired objects 80 and noise producing objects 82 in a sample 14. When the disturbing objects 82 are close in depth to the desired objects 80, error is introduced into the focus estimate. This error has been typically reduced by either spatially discriminating parts of the image 17 or, if the disturbing objects 82 are at the same x/y-position as the desired objects 80 but have different spectra, by adjusting the filter.

To generate a filter 48 according to this invention, an image signal 36 is grabbed at at least two positions, $z_1$ and $z_2$, which are the position for the expected optimal focus and another position some distance away from the optimal focus (defocus position), respectively.

At the two positions, $z_1$ and $z_2$, the involved raw images can be represented as $f(x,y,z_1)$ and $f(x,y,z_2)$, respectively, or for one row, $x_0$, for example:

$$f(x_0,y,z_1) = f_0(x_0,y,z_1) + n(x_0,y,\omega_1) \quad \text{Equation 6}$$

$$f(x_0,y,z_2) = f_0(x_0,y,z_2) + n(x_0,y,\omega_2) \quad \text{Equation 7}$$

Therefore, the corresponding filtered outputs, $h(x,y,z)$, are, for the same row:

$$h(x_0,y,z_1) = f_0(x_0,y,z_1)*g(y) + n(x_0,y,\omega_1)*g(y) \quad \text{Equation 8}$$

$$h(x_0,y,z_2) = f_0(x_0,y,z_2)*g(y) + n(x_0,y,\omega_2)*g(y) \quad \text{Equation 9}$$

Figures 4A, 4B:
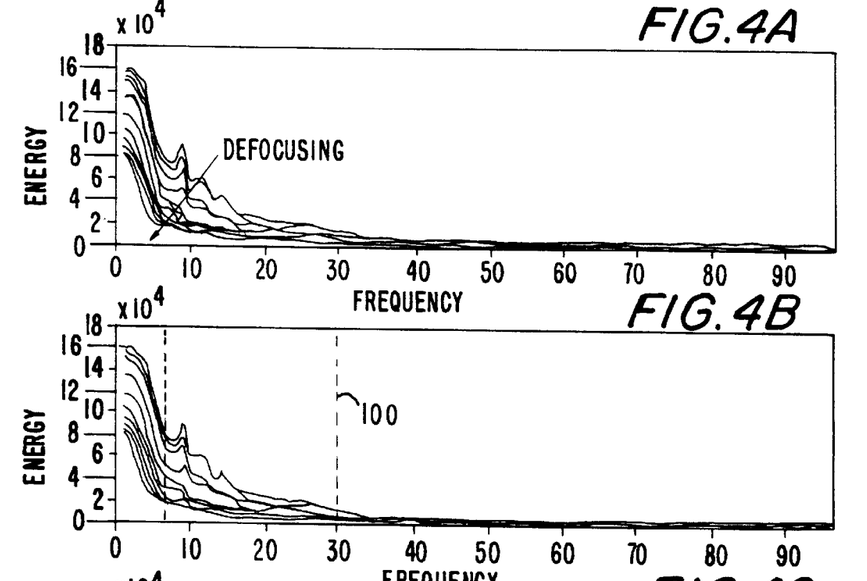
FIGS. 4A, 4B, 4C, and 4D are graphs of signal spectra, the different plots showing the effect of defocusing before and after filtering with a digital filter according to one embodiment of the invention.

FIG. 4A shows the frequency spectra of a row of an image for several different foci with the least focused spectrum appearing closest to the bottom. The concentration of energy at the lower frequencies in the frequency spectra demonstrates the importance of the lower frequencies for the image signal 36 for all the different foci. This concentration is caused by the strong 'low pass' effect (optical transfer function) of the objective lens 15 on the light arriving from or through the sample 14. Accordingly, the lower frequencies contain a relatively larger image content component than noise component from the image signal 36. In contrast, the higher frequencies, which are outside of the image component concentration area, contain a relatively larger noise component than image content component. Therefore, increasing the amount of energy contributed by the lower frequencies with respect to the higher frequencies emphasizes the image content component and de-emphasizes the noise component of the image signal 36.

Figure 4C:
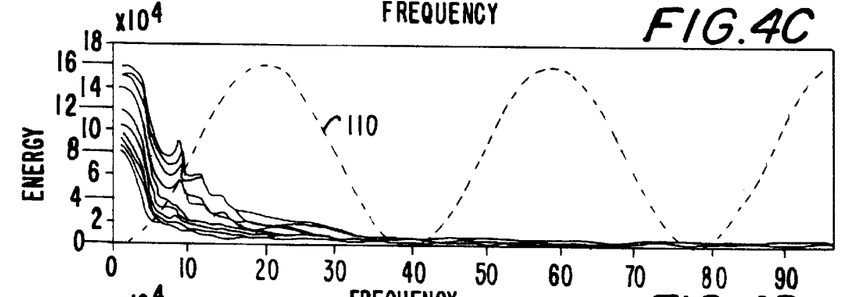

According to different embodiments of the invention, the following filters can be used:

(1) an optimal, linear filter (Wiener filter) (Not Shown)
(2) a bandpass filter (FIG. 4B); and
(3) a modified second order difference filter (FIG. 4C).

Each of these filters, g(y), is chosen in order to maximize the signal-to-noise ratio, which in one embodiment of this invention is defined as the difference in image content component signal energy, divided by the sum of the unwanted energies in two filtered images 40. Equation 10 is a mathematical representation showing a signal-to-noise ratio of image signal energies using one row from the same sample's image grabbed at each of two different foci:

$$SNR = \frac{E(f_0(x_0,y,z_1)^2 - f_0(x_0,y,z_2)^2)}{E((h(x_0,y,z_1) - f_0(x_0,y,z_1))^2) + E((h(x_0,y,z_2) - f_0(x_0,y,z_2))^2)} \quad \text{Equation 10}$$

where E is the expected value (as determined from probability), which in one embodiment of the invention is an energy level.

Since the filter 38 does not affect the signals in the numerator, maximizing the SNR is equivalent to finding a filter 38 that minimizes the denominator. Assuming that the z-dependent image content component and the noise component of the image signal 36 are uncorrelated, the energy in the denominator, D(g), can be expressed as a sum over all frequencies of functions of discrete Fourier transforms and spectral densities:

$$D(g) = \Sigma[|G(v)-1|^2 R_S(v) + |G(v)|^2 R_N(v)] \quad \text{Equation 11}$$

the spectral densities being defined as the squared absolute value of the discrete Fourier transform:

$$R_S(v) = R_{f_0,z_1}(v) - R_{f_0,z_2}(v) \quad \text{Equation 12}$$

$$R_N(v) = R_{n_{\omega_0}}(v) + R_{n_{\omega_1}}(v) = 2 \cdot R_n(v) \quad \text{Equation 13}$$

In other words, the filter 38 extracts the focus-dependent image content component information from the image signal 36 by amplifying the image content component. In so doing, the filter 38 also extracts some of the noise component present in the image signal 36. However, the filter 38 is chosen to minimize the amount of noise component information in energy level 42 by damping the noise component.

Since all the terms in D(g) are positive, the sum can be minimized by minimizing each of the terms independently. Following standard, although continuous signal, Wiener filter theory, the discrete Fourier transform of the optimum filter is:

$$G(v) = \frac{R_S(v)}{R_S(v) + R_N(v)} = \frac{R_{f_0, z_1}(v) - R_{f_0, z_2}(v)}{R_{f_0, z_1}(v) - R_{f_0, z_2}(v) + 2 \cdot R_n(v)} \quad \text{Equation 14}$$

One interpretation of this filter is that the amplification is close to one at frequencies where the image content component of the image signal 36 is much stronger than the noise component and close to zero when the noise component is much stronger than the image content component. By obtaining the discrete inverse Fourier transform of this optimal filter, G(v), the optimal filter, g(y), can be calculated. This optimal filter is a Wiener filter, and because one row of the image 17 can be filtered independently of adjoining rows, each row of the image signal 36 can be filtered as soon as the row is "grabbed".

Wiener filters, however, typically require time-consuming calculations, for example, in filter generator 46, Fourier transforms, and in filter calculator 32, complicated calculations. Also, Wiener filters can be sensitive to tolerances in a system. For example, in microscopy, the frequency spectrum of an object changes over time as other objects move into or out of the field of view.

The dotted lines 100 in FIG. 4B show a bandpass filter selected to emphasize or amplify those lower frequencies of the image signal 36 containing the greatest amount of image content with respect to the noise. This bandpass filter can be determined from frequency spectra like that shown in FIG. 4A, or, more simply, by trial and error of various bandpass filter frequencies. However, while bandpass filters are relatively simple to implement in hardware, implementation of a bandpass filter in software can be complex as well as time-consuming.

The dotted lines 110 in FIG. 4C show a modified second order difference filter ("modified filter") according to one embodiment of the invention. In the frequency domain, such a filter has the appearance of a sinusoidal wave form.

Figure 5A:
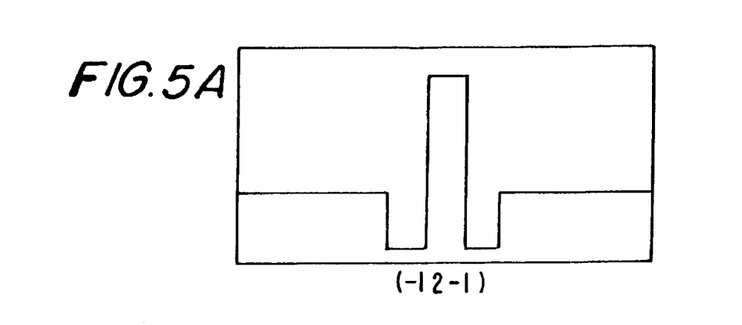
FIGS. 5A, 5B, 5C, 5D, 5E, and 5F are graphs that illustrate various filters in the time domain, and the frequency domain (Fourier transforms) according to embodiments of the invention.
Figures 5B, 5C:
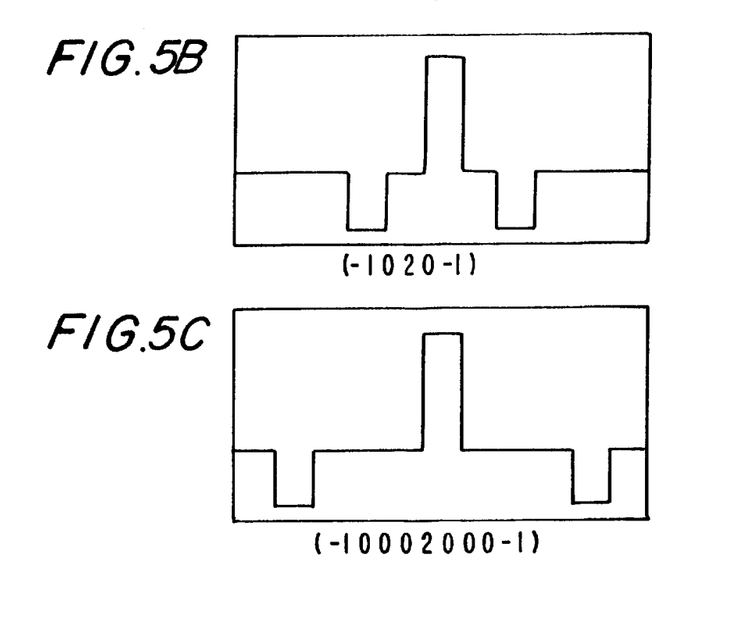
Figure 5D:
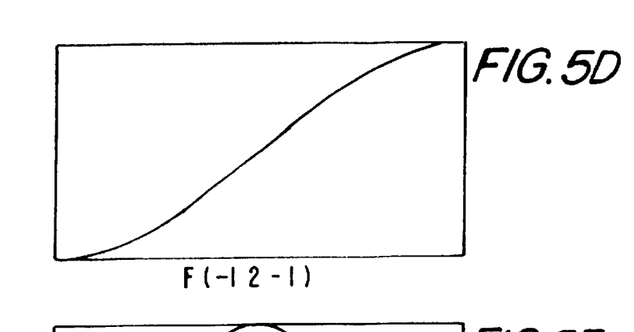

FIGS. 5A and 5D illustrate an ordinary second order difference filter. This second order difference filter can be implemented in software as a one row by three column array of [−1, 2, −1], as shown in FIG. 5A. However, the frequency distribution of this filter, as shown in FIG. 5D, emphasizes the higher frequencies over the lower frequencies whereas the image content information is concentrated at the lower frequencies.

Figure 4D:
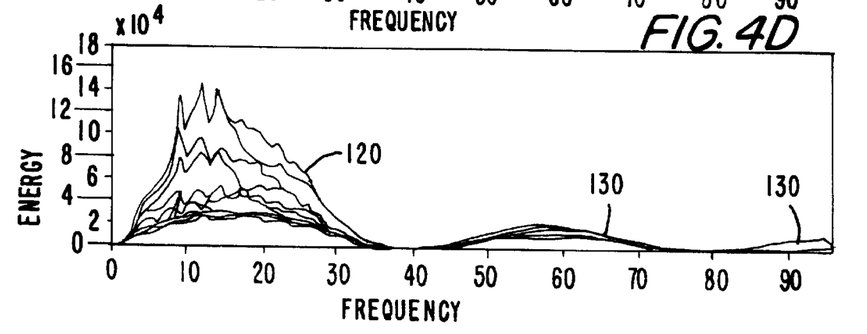
Figures 5E, 5F:
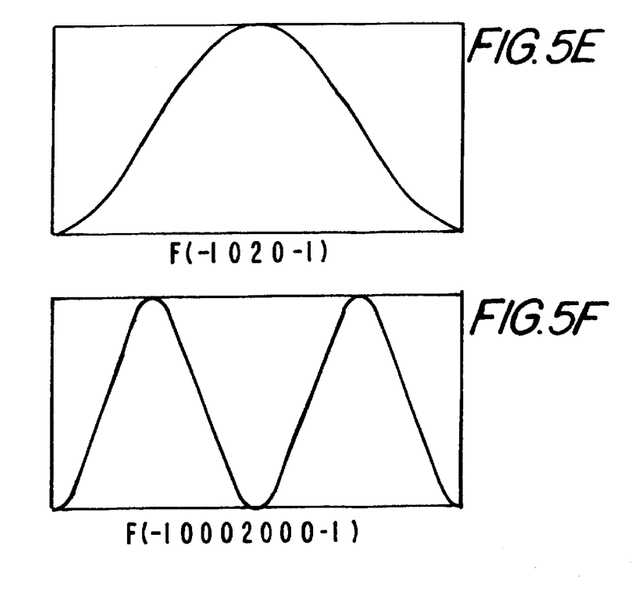

FIGS. 5B, 5C, 5E, and 5F illustrate modified second order difference filters according to an embodiment of this invention which can be implemented in software almost as simply as the second order difference filter. The modification consists of adding internal zeros in the filter as shown in FIGS. 5B (one zero) and 5C (three zeros). The frequency distributions are shown in FIGS. 5E and 5F, respectively. As compared to FIG. 5D, the modified filter shown in FIG. 5F enhances the lower frequencies and some of the higher frequencies. However, because the higher frequencies only contain lower energy noise, the amplified lower frequencies more than compensate for this amplification of the higher frequencies. This effect is illustrated in FIG. 4D, where the sinusoidal frequency distribution has been tuned to fit the frequency spectra of FIG. 4A. The lower frequency amplification 120 substantially increases the percentage of energy contributed by the lower frequencies with respect to the increase in energy contributed by the higher frequency amplifications 130.

Other modified filters can be created by inserting additional zeros into the filter. Thus, the frequency distribution of the modified filter can be tuned to image signals 36 by changing the number of consecutive zeros in the discrete filter. The tuning, or modified filter selection, can be performed, for example: (1) by trial and error with an operator determining which modified filter produces the sharpest images; (2) by obtaining the frequency spectrum and selecting where to place the sinusoidal minimum(s); or (3) mathematically, by modifying the maximization of the SNR performed in Equation 14 (in the modified maximization technique, however, the filter spectrum G(f) is restricted to the class of modified second order difference filters).

One advantage of the modified filter is the relatively simple implementation of the filter generator 46 in software because only one parameter, the number of internal zeros, is adjusted. Despite this simplicity, the modified filter, once selected, is also robust in quickly generating the filtered image signal 40 which is used to rapidly arrive at the optimal focus.

Because of the robustness of the modified filter, a non-integer number of zeros is not required. Nevertheless, should an embodiment employing a non-integer number of zeros be needed, such a modified filter can be implemented by changing the magnification of the objective lens 15 and/or the pixel size.

Other characteristics of the filter, especially with respect to the five factors (A–E) relating to the image signal spectrum discussed above, should also be considered.

If an image sharpening filter (not shown) operates on the image signal 36 before the filter calculator 32, both the image sharpening filter and the filter 38 affect the focus, that is, the product of image sharpening filter and the filter 38 becomes a compound implementation of what previously was done only by filter 38. Such a compound implementation can be beneficial if the image sharpening filter is needed for image analysis 50, and the resulting image sharpened signal can be more simply processed by the filter calculator 32 than the unsharpened filtered image. However, if an image sharpening filter is applied without a careful design for use with the filter calculator 32 and filter 38, the resulting compound implementation most likely will result in a degraded SNR having greater noise-sensitivity.

The number of zeroes to select for the filter 38 also varies depending on the search step length (for example, the amount of distance moved by the objective lens 15 in the z-direction for each step). Since coarse adjustment of the focus uses larger search steps than fine adjustment, the optimum number of zeroes should be larger than for the fine adjustment. Additional zeroes are typically needed to increase the energy level 42 for foci in a region along the search direction (z-direction) near the optimal focus so that the optimal (maximum) focus will not be 'stepped over' (missed) by the larger search steps of coarse adjustment. The additional zeroes shift the enhancement (amplification) toward the lower frequencies, thereby increasing the energy level 42 for a greater number of foci. However, these higher energy levels also decrease the energy level difference between the optimal focus and nearby foci. Accordingly, fine adjustment typically requires fewer zeroes than coarse adjustment.

Another consideration is the presence of desired objects 80 at different depths in a sample 14. To compensate, the spatial extent of the image 17 to be evaluated by the filter calculator 32 can be limited. One way to limit the spatial extent is to locate single desired objects 80 in the image signal 36, even if the image 17 is slightly defocused. To isolate an object, a quadratic region can be defined in a known manner around the center of the region of interest. For the embodiments of this invention, this quadratic segmentation is sufficient to prevent desired objects at different depths 84 from significantly interfering in the energy level 42 corresponding to the particular focus.

The maximum energy level 42 obtained using filter 38 depends on how many objects 80 and what kind of objects are situated in the desired area of the image. Accordingly, the area of the object that is selected for input to the filter calculator 32 must be kept fairly constant while performing fine focusing. However, the objects 80 do not have to be kept completely still relative to the objective lens 15 if the quadratic segmentation can isolate the quadratic region. Thus, according to this invention, so long as the quadratic region area remains fairly unchanged in spite of an on-going slow scan, autofocusing can still be performed.

Another consideration is the problem of nearby disturbing objects 82. In microscopy, this problem is primarily related to the sample 14 and not to the autofocusing system. For example, if the disturbing objects 82 are in same x-y plane area as the objects of interest (desired objects 80), or if disturbing smaller objects 86 are located at other depths, the frequency spectrum may have to be further limited to discriminate against such disturbing objects. When discriminating, either in the spatial domain or in the frequency domain, the information available for the filter calculator 32 decreases. The chosen discrimination is a trade-off between faster processing speed and the need for locating at least one object to obtain some information on the focus sharpness. If the filter calculator 32 is too sensitive to noise, such a discrimination results in inferior focus position estimates. Therefore, for a noise-sensitive filter 38 the possibilities for discrimination are limited. Because so much of the frequency spectrum may have to be filtered to eliminate the disturbing objects 82, 86, in some situations, the whole image 17 may be required to generate an image signal 36 for the filter calculator 32 which can result in a maximum having contributions from separate single object maxima. However, with the modified filter of this invention, the best results are often achieved when using only the pixels of one object, situated at a selected depth in the sample 14.

Figure 6A:
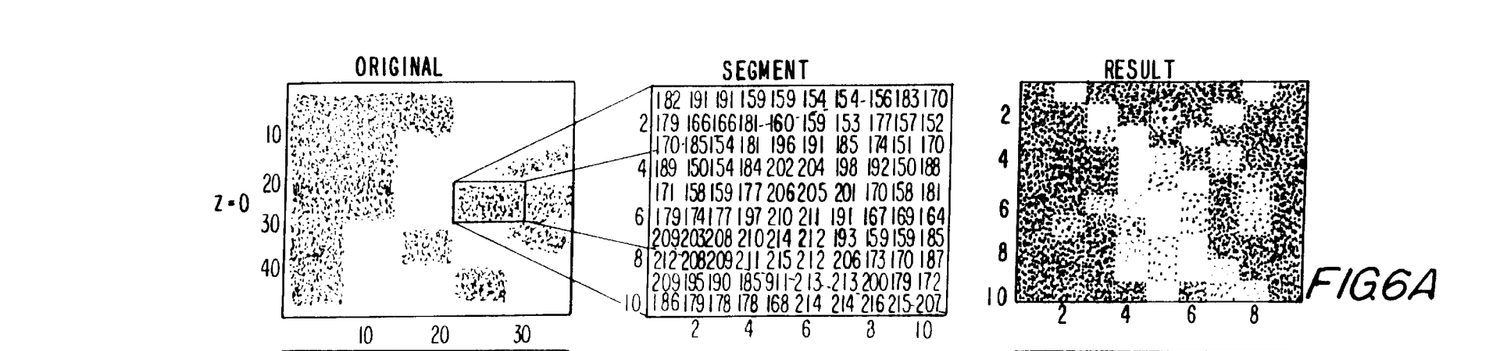
FIGS. 6A, 6B, and 6C are images from three different focus depths (z=0, 5 and 10) and illustrate the effects of one of the filters according to one embodiment of the invention.
Figure 6B:
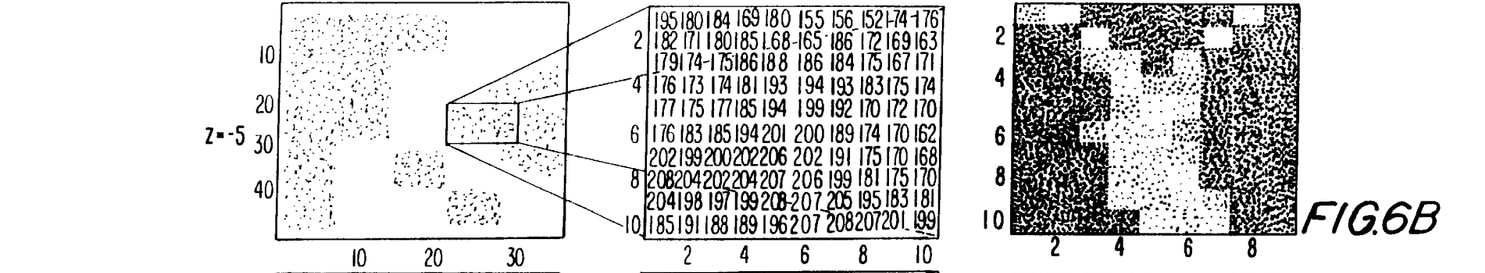
Figure 6C:
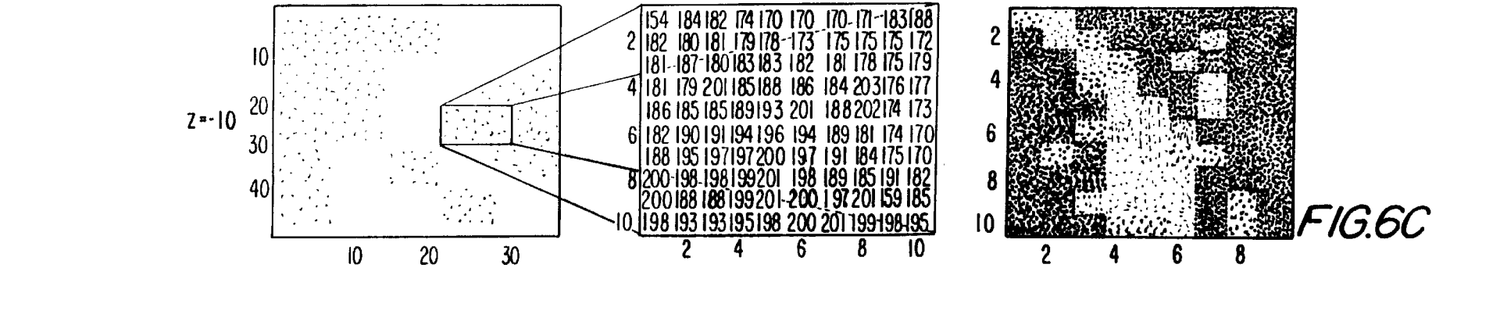

FIGS. 6A, 6B, and 6C illustrate the effect of the filter 38 on images taken at three different depths of focus. In the right column, the filtered images, h(x,y,z), are shown. FIG. 6A, the upper image, has the highest energy, as calculated by the energy calculator 34. The filter 38 used for FIG. 6A is a modified filter. In these figures, the higher the value of the pixel, the brighter the pixel appears.

Figure 7:
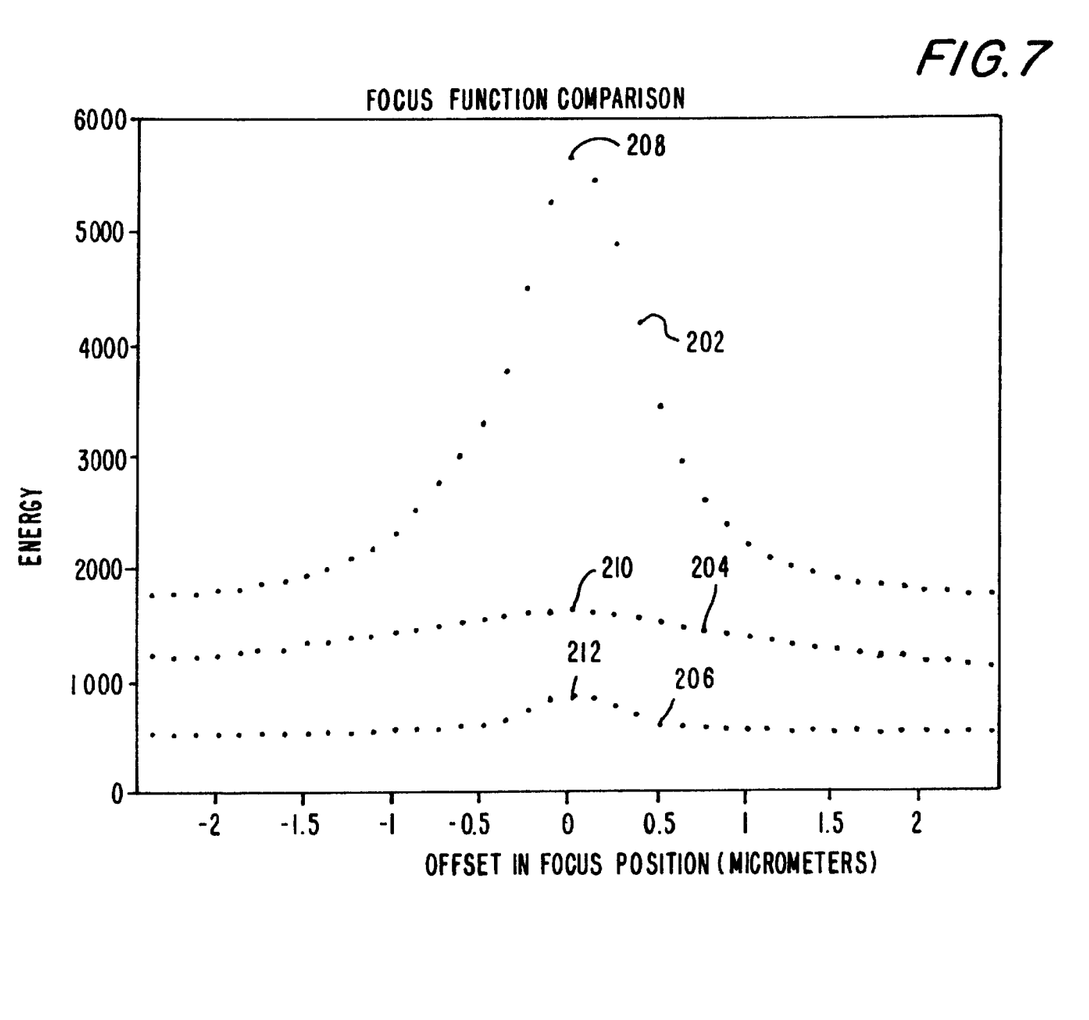
FIG. 7 is a graph which compares the autofocusing ability of two conventional filters with the autofocusing ability of one embodiment of the invention.

FIG. 7 illustrates the energy level outputs for three filters at several different foci near the optimal focus. The modified filter of one embodiment of this invention is represented by curve 202; curve 204 is a conventional [1 –2 1] second order difference filter; and curve 206 is derived from an ordinary statistical variance calculation without any prefiltering.

In FIG. 7, according to one embodiment of the invention, the object (sample 14) was a white blood cell stained according to the May-Grünwald-Giemsa (MGG) method, and the experiment was relatively free from noise and disturbing objects 82, 86. From these experimental results, the modified second order difference filter is demonstrated to give a more defined peak 208 in terms of peak width and peak magnitude than the peak 210 of an ordinary second order difference filter or the peak 212 provided by ordinary statistical variance. Also, because the half response is narrower for the modified filter than the ordinary second order difference filter, the focal distance resolution of the modified filter is better than for the ordinary second order difference filter. One result is a lower sensitivity to disturbing objects 82, 86 that are situated at nearby focus depths.

Also, the modified filter peak 208 is relatively stronger than provided by the other two filters. This larger response is caused by the superior signal-to-noise ratio, SNR, of a well matched modified filter. Indeed, the closer a modified filter's characteristics are to an optimal filter (Wiener filter), the better is the SNR, and the sharper and stronger the response curve 202.

In many situations, the image sensor 16 provides an excess of image content information in the desired part of the image 17, for example, many more rows than required. In such a situation, not all of the lines (rows) need to be processed by the filter calculator 32 and energy calculator 34 and fewer lines to process, allows for quicker calculations. Indeed, in one embodiment of the invention having 100 rows, good autofocusing was achieved by using only every fifth row.

While this invention has been described in terms of filtering in one direction, in particular, horizontal filtering of the image signal 36, filtering in other directions may be preferable in some situations. For example, images 17 containing horizontal lines, require vertical filtering, or a combination of vertical and horizontal filtering to autofocus. Either of these other types of filtering can be added, for example, after the squaring in the energy calculation. Although, combined filtering is more computationally complex, more of the image content information is utilized.

Also, while the filter can be the same for all rows and/or columns in an image signal 36, in some situations, if different parts of the image signal have significantly different responses to defocusing, the use of a fixed filter is not optimal. In such a situation, different filters 38 can be optimized for different regions of the image 17. For each region however, the principles are the same as described above.

Since the filter calculator 32 and the energy calculator 34 perform simple calculations according to this invention, each calculator 32, 34 can be implemented in for example, hardware in the image sensor 16 or elsewhere. Such hardware may be analog or digital.

Also, because the filters of this invention are not causal, the filtering introduces a slight delay in the filtered image signal 40. The delay is, for a row-wise filtering, less than one row-time. When doing an efficient implementation in hardware one may have to choose a fixed filter 38 at the time the circuit for the autofocus system is created. However, as long as the output of the optical system is sampled with an appropriate spatial frequency, such an implementation will have a performance resembling the one described above and adjustments may be made by changing the optical magnification.

Because the filtering system of this invention uses integer weights on integer pixel information, the filtering system is well suited for implementation on off-the-shelf controllers, such as general purpose microprocessors, and/or digital signal processors (DSPs), which can perform integer mathematics.

In one embodiment of the invention, the following equipment was used:

| | |
|---|---|
| Microscope frame: | Olympus BX50-WIF |
| Condensor: | Olympus U-SC2 with top lens engaged and NA = 0.9 |
| Power supply unit: | Olympus TH3 |
| Lamp housing: | Olympus U-LH100L |
| Halogen bulb: | Osram HLX 64625 (12 V 100 W Xenophot) |
| Objective: | Olympus UplanFl 100X/NA 1.30/oil |
| TV adapter: | Olympus U-TV0.5X |
| Camera adapter: | Olympus U-SMAD |

-continued

| | |
|---|---|
| Trinocular observation tube: | Olympus U-TR30 |
| Immersion oil: | Cargille Cat. No. 16482 |
| Video camera: | Sony 9100 3-chip with 8.2 um pitch D-sub RGB-snyc used |
| Frame grabber card: | Matrox Meteor II Frame grabber card |

With this equipment, one pixel corresponds to 8.2/50≈0.16 micrometers in the desired objects 80, that is, approximately 6 pixels per micrometer. For the second finest tuning, every fifth row and three consecutive filter zeros are used. In the finest tuning, as illustrated in curve 202 of FIG. 7, every third row and two consecutive filter zeros were used. Also, because the green component of the standard 3-chip video camera was been found to have good autofocusing properties, only this colour component was used.

While this invention has been described in terms of specific embodiments, this invention, including this disclosure and appended claims, is not so limited and is to be construed in accordance with the full spirit and scope of the invention including alternatives and modifications made apparent to those skilled in the art.

We claim:

1. A device for determining a focus between an image sensor and an object comprising:

an image sensor for receiving an image of the object and for generating an image signal from the image, the image signal having an image component and a noise component;

a filter calculator for receiving the image signal and for generating a filtered image signal such that the noise component of the image signal has been reduced, the noise component being reduced by increasing energy contributions from parts of the image signal which contribute a relatively larger proportion to the image component than the noise component and by decreasing energy contribution from other parts of the image signal which contribute a relatively larger portion to the noise component than to the image component;

an energy calculator for receiving the filtered image signal and determining an energy level of the filtered image signal;

a controller for receiving the energy level and for generating a control signal in accordance with the energy level; and a positioning mechanism for receiving the control signal and performing a focus adjustment based on the control signal;

wherein the filter calculator further comprises:
 a linear convoluter; and
 a filter selected from the group consisting of: a Wiener filter, a modified second order difference filter, and a bandpass filter.

2. A device for determining a focus between an image sensor and an object comprising:

an image sensor for receiving an image of the object and for generating an image signal from the image, the image signal having an image component and a noise component;

a filter calculator for receiving the image signal and for generating a filtered image signal such that the noise component of the image signal has been reduced, the noise component being reduced by increasing energy contributions from parts of the image signal which contribute a relatively larger proportion to the image component than the noise component and by decreasing energy contributions from other parts of the image signal which contribute a relatively larger portion to the noise component than to the image component;

an energy calculator for receiving the filtered image signal and determining an energy level of the filtered image signal;

a controller for receiving the energy level and for generating a control signal in accordance with the energy level;

a positioning mechanism for receiving the control signal and performing a focus adjustment based on the control signal; and a filter generator for determining filter characteristics, the filter generator comprising:
 (1) a frequency spectrum generator for receiving image signals and for generating image frequency signals; and
 (2) a filter optimizer for receiving the image frequency signals to select those filter characteristics which maximize a signal-to-noise ratio of at least a portion of the image signals.

3. A device for determining a focus between an image sensor and an object comprising:

an image sensor for receiving an image of the object and for generating an image signal from the image, the image signal having an image component and a noise component;

a filter calculator for receiving the image signal and for generating a filtered image signal such that the noise component of the image signal has been reduced, the noise component being reduced by increasing energy contributions from parts of the image signal which contribute a relatively larger proportion to the image component than the noise component and by decreasing energy contributions from other parts of the image signal which contribute a relatively larger portion to the noise component than to the image component;

an energy calculator for receiving the filtered image signal and determining an energy level of the filtered image signal;

a controller for receiving the energy level and for generating a control signal in accordance with the energy level;

a positioning mechanism for receiving the control signal and performing a focus adjustment based on the control signal; and a filter generator for determining filter characteristics, the filter generator comprising:
 a modified second order difference filter generator for selecting a modified second order difference filter from a group of modified second order difference filters which by selecting the modified second order difference filter which yields a maximum ratio of peak energy level to peak energy width for a plurality of image signals.

4. A device for determining a focus between an image sensor and an object comprising:

an image sensor for receiving an image of the object and for generating an image signal from the image, the image signal having an image component and a noise component;

a filter calculator for receiving the image signal and for generating a filtered image signal such that the noise component of the image signal hag been reduced, the
noise component being reduced by increasing energy
contributions from parts of the image signal which
contribute a relatively larger proportion to the image
component than the noise component and by decreasing energy contributions from other parts of the image
signal which contribute a relatively larger portion to the
noise component than to the image component;

an energy calculator for receiving the filtered image signal
and determining an energy level of the filtered image
signal;

a controller for receiving the energy level and for generating a control signal in accordance with the energy
level; and a positioning mechanism for receiving the control signal
and performing a focus adjustment based on the control
signal;

wherein the filter calculator only operates on the image
signal corresponding to a single direction in the image.

5. A device for determining a focus between an image sensor and an object comprising:

an image sensor for receiving an image of the object and
for generating an image signal from the image, the
image signal having an image component and a noise
component;

a filter calculator for receiving the image signal and for
generating a filtered image signal such that the noise
component of the image signal has been reduced, the
noise component being reduced by increasing energy
contributions from parts of the image signal which
contribute a relatively larger proportion to the image
component than the noise component and by decreasing energy contributions from other parts of the image
signal which contribute a relatively larger portion to the
noise component than to the image component;

an energy calculator for receiving the filtered image signal
and determining an energy level of the filtered image
signal;

a controller for receiving the energy level and for generating a control signal in accordance with the energy
level; and a positioning mechanism for receiving the control signal
and performing a focus adjustment based on the control
signal;

wherein the filter calculator only operates on portions of
the image signal corresponding to selected sections of
the image.

6. A device according to claim 3, wherein each filter of the group of modified second order difference filters comprises:

a first negative value, one or more first zero values, a
positive value, one or more second zero values, and a
second negative value.

7. A device according to claim 6, wherein the number of zero values does not exceed 15.

8. A device for determining a focus between an image sensor and an object comprising:

an image sensor for receiving an image of the object and
for generating an image signal from the image, the
image signal having an image component and a noise
component;

a filter calculator for receiving the image signal and for
generating a filtered image signal such that the noise
component of the image signal has been reduced, the
noise component being reduced by increasing energy
contributions from parts of the image signal which
contribute a relatively larger proportion to the image
component than the noise component and by decreasing energy contributions from other parts of the image
signal which contribute a relatively larger portion to the
noise component than to the image component;

an energy calculator for receiving the filtered image signal
and determining an energy level of the filtered image
signal;

a controller for receiving the energy level and for generating a control signal in accordance with the energy
level; and a positioning mechanism for receiving the control signal
and performing a focus adjustment based on the control
signal;

wherein the filter calculator employs a filter implemented
as a one dimensional array.

9. A method for determining a focus between an image sensor and an object comprising the steps of:

generating an image signal from an image of the object,
the image signal having an image component and a
noise component;

filtering the image signal to generate a filtered image
signal such that the noise component of the image
signal has been reduced by increasing energy contributions from parts of the image signal which contribute
a relatively larger proportion to the image component
than the noise component and by decreasing energy
contributions from other parts of the image signal
which contribute a relatively larger portion to the noise
component than to the image component;

generating an energy level from the filtered image signal;

generating a control signal from the energy level; and changing the focus according to the control signal;

wherein the filtering step further comprises the step of:
convolving a filter with the image signal;
the filter selected from the group consisting of: a
Wiener filter, a modified second order difference
filter, and a bandpass filter.

10. A method for determining a focus between an image sensor and an object comprising the steps of:

generating an image signal from an image of the object,
the image signal having an image component and a
noise component;

filtering the image signal to generate a filtered image
signal such that the noise component of the image
signal has been reduced by increasing energy contributions from parts of the image signal which contribute
a relatively larger proportion to the image component
than the noise component and by decreasing energy
contributions from other parts of the image signal
which contribute a relatively larger portion to the noise
component than to the image component;

generating an energy level from the filtered image signal;

generating a control signal from the energy level;

changing the focus according to the control signal; and generating a filter from frequency spectra of one or more
image signals; and optimizing the filter by selecting
those characteristics which maximize a signal-to-noise
ratio of at least a portion of the image signals.

11. A method for determining a focus between an image sensor and an object comprising the steps of:

generating an image signal from an image of the object,
the image signal having an image component and a
noise component;

filtering the image signal to generate a filtered image signal such that the noise component of the image signal has been reduced by increasing energy contributions from parts of the image signal which contribute a relatively larger proportion to the image component than the noise component and by decreasing energy contributions from other parts of the image signal which contribute a relatively larger portion to the noise component than to the image component;

generating an energy level from the filtered image signal;

generating a control signal from the energy level;

changing the focus according to the control signal; and generating a modified second order difference filter by selecting the modified second order difference filter from a group of modified second order difference filters which yields a maximum ratio of peak energy level to peak energy width for a plurality of image signals.

12. A method for determining a focus between an image sensor and an object comprising the steps of:

generating an image signal from an image of the object, the image signal having an image component and a noise component;

filtering the image signal to generate a filtered image signal such that the noise component of the image signal has been reduced by increasing energy contributions from parts of the image signal which contribute a relatively larger proportion to the image component than the noise component and by decreasing energy contributions from other parts of the image signal which contribute a relatively larger portion to the noise component than to the image component;

generating an energy level from the filtered image signal;

generating a control signal from the energy level; and changing the focus according to the control signal;

wherein the step of filtering further comprises:

operating on the image signal corresponding to a single direction in the image.

13. A method for determining a focus between an image sensor and an object comprising the steps of:

generating an image signal from an image of the object, the image signal having an image component and a noise component;

filtering the image signal to generate a filtered image signal such that the noise component of the image signal has been reduced by increasing energy contributions from parts of the image signal which contribute a relatively larger proportion to the image component than the noise component and by decreasing energy contributions from other parts of the image signal which contribute a relatively larger portion to the noise component than to the image component;

generating an energy level from the filtered image signal;

generating a control signal from the energy level; and changing the focus according to the control signal;

wherein the step of filtering further comprises:

operating only on selected sections of the image signal.

14. A method for determining a focus between an image sensor and an object comprising the steps of:

generating an image signal from an image of the object, the image signal having an image component and a noise component;

filtering the image signal to generate a filtered image signal such that the noise component of the image signal has been reduced by increasing energy contributions from parts of the image signal which contribute a relatively larger proportion to the image component than the noise component and by decreasing energy contributions from other parts of the image signal which contribute a relatively larger portion to the noise component than to the image component;

generating an energy level from the filtered image signal;

generating a control signal from the energy level;

changing the focus according to the control signal; and generating a modified second order difference filter to be employed in the filter calculator by selecting the number of zeros to place between each respective endpoint and the center of the modified second order difference filter.

15. A method for determining a focus between an image sensor and an object comprising the steps of:

generating an image signal from an image of the object, the image signal having an image component and a noise component;

filtering the image signal to generate a filtered image signal such that the noise component of the image signal has been reduced by increasing energy contributions from parts of the image signal which contribute a relatively larger proportion to the image component than the noise component and by decreasing energy contributions from other parts of the image signal which contribute a relatively larger portion to the noise component than to the image component;

generating an energy level from the filtered image signal;

generating a control signal from the energy level; and changing the focus according to the control signal;

wherein the parts of the image signal having increased energy contributions correspond to the lower frequencies of the image.

* * * * *